3,022,275
VULCANIZATION ACCELERATORS

Friedrich Lober, Leverkusen-Bayerwerk, Ernst Roos, Leverkusen, and Theo Kempermann, Köln-Lindenthal, Germany, assignors to Farbenfabriken Bayer Aktiengesellschaft, Leverkusen, Germany, a corporation of Germany
No Drawing. Filed June 2, 1959, Ser. No. 817,453
Claims priority, application Germany June 4, 1958
8 Claims. (Cl. 260—79)

This invention relates to the vulcanization of chloro-2-butadiene polymers and copolymers thereof and to vulcanization accelerators for said vulcanization process.

For the vulcanization of chloro-2-butadiene polymers and their copolymers with vinyl or diene compounds, in which chloro-2-butadiene is the predominant component, there are usually employed metal oxides, for example zinc oxide, lead oxide or in particular combinations of the zinc oxide and magnesium oxide.

The mechanical data of the vulcanizates produced in this way do not in every case conform to practical requirements. In particular, chloro-2-butadiene polymers, which have a good capacity for storage, generally require the addition of further substances exerting an accelerating and/or cross-linking effect. These products, hereinafter briefly referred to as "accelerators," produce an improvement in the elastic level, i.e. an increase in the rebound elasticity, and also an increase in the modulus and hardness and an improvement in the strength properties.

Vulcanization accelerators such as are used in connection with natural rubber can in principle also be used as accelerators for chloro-2-butadiene polymers, these accelerators being for example diphenyl guanidine, di-tolyl-o-guanidine, tetramethyl thiuram disulfide, tetramethyl thiuram monosulfide, butylaldehyde-anilide condensation products etc. The said products are, however, not satisfactory in all cases, perhaps because they only slightly improve the mechanical level produced with metal oxide by itself or perhaps because the mixtures produced therewith are scorchy.

An additional improvement is provided by products which have inherently been developed for use in connection with chlorobutadiene polymers and are of less importance for the vulcanization of natural rubber. These are primarily cyclic or open-chain derivatives of thiourea. These products generally combine a good elastic level with a to some extent satisfactory resistance of the raw mixture to scorch.

It has now been found that thiosemicarbazides of the general formula

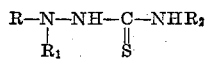

in which the radicals R, $R_1$ and $R_2$ stand for hydrogen and/or hydrocarbon radicals, are very suitable as vulcanization accelerators for polymers which have been obtained from chlorobutadiene or co-polymers thereof with e.g. vinyl or diene compounds which consist essentially of chlorobutadiene.

Examples of the compounds to be used according to the invention are set out below:

| | Melting point, °C. |
|---|---|
| Thiosemicarbazide | 182–183 |
| 4-tert.-butylthiosemicarbazide | 138–139 |
| 4-tert.-octylthiosemicarbazide | 85–87 |
| 4-phenylthiosemicarbazide | 140–141 |
| 1-phenylthiosemicarbazide | 200–201 |
| 4-allylthiosemicarbazide | 98–99 |
| 1,4-diphenylthiosemicarbazide | 177 |
| 4-ethyl-1-p-tolyl-1-methyl-thiosemicarbazide | 121 |
| 4-methylthiosemicarbazide | 137–138 |
| 1,1,4-trimethylthiosemicarbazide | 154–155 |
| 1,1-dimethyl-4-ethylthiosemicarbazide | 96 |
| 1,1-dimethyl-4-tert.-butylthiosemicarbazide | 152 |
| 1,1-diethyl-4-tert.-butylthiosemicarbazide | 115 |
| 1-methyl-1-cyclohexyl-4-tert.-butylthiosemicarbazide (liquid, yellow oil). | |

If the radicals R, $R_1$ and $R_2$ in the formula given above stand for hydrocarbon radicals they advantageously contain up to 8 carbon atoms. These hydrocarbon radicals can comprise both saturated and unsaturated aliphatic hydrocarbons or also cycloalkyl or phenyl radicals.

The compounds employed according to the invention can for example be prepared in a manner known per se by reaction of hydrazine or substituted hydrazines with compounds which contain the group —NCS or —SCN, that is to say, isothiocyanic acid esters (mustard oils), thiocyanic acid esters, or inorganic thiocyanates.

The said compounds are generally well crystallized and odorless or have only a slight odor. They can easily be incorporated into the chlorobutadiene polymer or co-polymers consisting essentially of chlorobutadiene and do not discolor the vulcanizate. The compounds develop their accelerating action in admixture with other materials such as active carbon black, inactive carbon black, light-colored active and light-colored inactive fillers.

The vulcanizates obtained with the compound used according to the invention have an outstanding elastic level, combined with good resistance of the raw mixture against scorch, excellent resistance to ageing, and also good compression-set data.

The compounds are added to the mixtures to be accelerated in quantities from 0.1 to 5% by weight, advantageously 0.3 to 1.5% by weight, based on the rubber content. The mixtures are then brought into the required shape by known processes and vulcanized at the heating temperatures usual for chloro-2-butadiene polymers.

The following examples further illustrate the invention without limiting it thereto.

EXAMPLE 1

The following mixtures were prepared on the mill:

| | 1A, parts by weight |
|---|---|
| Chloro-2-butadiene polymer | 100.0 |
| Active carbon black | 30.0 |
| Zinc oxide | 5.0 |
| Magnesium oxide | 4.0 |
| and | |
| Aldol-α-naphthylamine | 1.0 |

The mixtures 1B–1F below contain 0.5 part by weight of each of one of the following vulcanization accelerators:

1B 4-tert.-butylthiosemicarbazide
1C 4-phenylthiosemicarbazide
1D 1,1,4-trimethylthiosemicarbazide
1E 1,1-dimethyl-4-tert.-butylthiosemicarbazide
1F 1,1-diethyl-4-tert.-butylthiosemicarbazide The vulcanizates produces by heating in a press give the following mechanical data:

Table I

| Vulcanization temperature °C. | Vulcanization time (min.) | Tensile strength in kg./cm.² | | | | | |
|---|---|---|---|---|---|---|---|
| | | 1A | 1B | 1C | 1D | 1E | 1F |
| 111 | 10 | 31 | 123 | 89 | 52 | 43 | 28 |
| 111 | 20 | 33 | 186 | 143 | 72 | 50 | 36 |
| 111 | 40 | 47 | 231 | 195 | 121 | 95 | 62 |
| 111 | 60 | 60 | 234 | 213 | 164 | 131 | 110 |
| 151 | 10 | 146 | 231 | 240 | 236 | 243 | 219 |
| 151 | 20 | 187 | 234 | 226 | 244 | 238 | 222 |
| 151 | 30 | 187 | 247 | 236 | 240 | 248 | 228 |
| 151 | 40 | 190 | 235 | 250 | 233 | 238 | 234 |
| 151 | 60 | 180 | 248 | 245 | 226 | 231 | 235 |

Table II

| Vulcanization temperature °C. | Vulcanization time (min.) | Elongation in percent | | | | | |
|---|---|---|---|---|---|---|---|
| | | 1A | 1B | 1C | 1D | 1E | 1F |
| 111 | 10 | 1,135 | 770 | 785 | 1,120 | 1,120 | 1,260 |
| 111 | 20 | 1,155 | 655 | 680 | 890 | 1,150 | 1,145 |
| 111 | 40 | 935 | 570 | 640 | 800 | 900 | 1,000 |
| 111 | 60 | 820 | 510 | 580 | 750 | 820 | 935 |
| 151 | 10 | 655 | 415 | 480 | 650 | 590 | 540 |
| 151 | 20 | 550 | 380 | 415 | 520 | 490 | 455 |
| 151 | 30 | 490 | 380 | 410 | 460 | 455 | 435 |
| 151 | 40 | 485 | 375 | 415 | 430 | 440 | 425 |
| 151 | 60 | 440 | 365 | 410 | 400 | 410 | 415 |

Table III

| Vulcanization temperature °C. | Vulcanization time (min.) | Modulus at 300% elongation kg./cm.² | | | | | |
|---|---|---|---|---|---|---|---|
| | | 1A | 1B | 1C | 1D | 1E | 1F |
| 111 | 10 | 9 | 41 | 28 | 7 | 8 | 6 |
| 111 | 20 | 10 | 72 | 48 | 8 | 8 | 8 |
| 111 | 40 | 15 | 99 | 76 | 10 | 15 | 16 |
| 111 | 60 | 20 | 112 | 91 | 25 | 30 | 30 |
| 151 | 10 | 53 | 138 | 125 | 82 | 90 | 92 |
| 151 | 20 | 74 | 159 | 138 | 107 | 115 | 111 |
| 151 | 30 | 89 | 162 | 150 | 125 | 128 | 129 |
| 151 | 40 | 87 | 164 | 155 | 127 | 130 | 135 |
| 151 | 60 | 96 | 171 | 148 | 129 | 132 | 136 |

Table IV

| Vulcanization temperature °C. | Vulcanization time (min.) | Resilience (percent) at 75° C. | | | | | |
|---|---|---|---|---|---|---|---|
| | | 1A | 1B | 1C | 1D | 1E | 1F |
| 111 | 10 | 39 | 46 | 46 | 45 | 42 | 41 |
| 111 | 20 | 40 | 50 | 48 | 45 | 41 | 40 |
| 111 | 40 | 40 | 48 | 46 | 41 | 38 | 40 |
| 111 | 60 | 40 | 47 | 43 | 38 | 38 | 40 |
| 151 | 10 | 43 | 50 | 47 | 43 | 46 | 45 |
| 151 | 20 | 44 | 50 | 49 | 46 | 48 | 46 |
| 151 | 30 | 46 | 50 | 50 | 47 | 50 | 50 |
| 151 | 40 | 47 | 50 | 50 | 49 | 51 | 50 |
| 151 | 60 | 47 | 51 | 50 | 50 | 51 | 51 |

Table V

| Vulcanization temperature °C. | Vulcanization time (min.) | Hardness, degrees Shore | | | | | |
|---|---|---|---|---|---|---|---|
| | | 1A | 1B | 1C | 1D | 1E | 1F |
| 111 | 10 | 35 | 54 | 50 | 42 | 44 | 37 |
| 111 | 20 | 40 | 58 | 55 | 45 | 44 | 40 |
| 111 | 40 | 45 | 64 | 62 | 55 | 54 | 45 |
| 111 | 60 | 49 | 66 | 65 | 59 | 56 | 50 |
| 151 | 10 | 56 | 64 | 64 | 61 | 62 | 59 |
| 151 | 20 | 60 | 66 | 65 | 65 | 64 | 62 |
| 151 | 30 | 64 | 66 | 66 | 66 | 65 | 64 |
| 151 | 40 | 65 | 66 | 66 | 67 | 65 | 64 |
| 151 | 60 | 65 | | | 68 | 65 | 65 |

Similar good results are obtained if instead of the chloro-2-butadiene polymer there are used co-polymers obtained from essentially chloro-2-butadiene and small amounts of dichlorobutadiene, styrene or acrylonitrile.

We claim:

1. In a process for the metal oxide vulcanization of a polymer selected from the group consisting of chloroprene homopolymers and chloroprene copolymers containing copolymerized therein in small amounts a monomer selected from the group consisting of dichlorobutadiene, styrene, and acrylonitrile, the improvement comprising mixing the aforesaid polymer with 0.1–5% by weight of a vulcanization accelerator of the general formula:

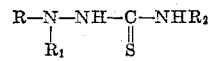

in which R, $R_1$ and $R_2$ stand for a member selected from the group consisting of hydrogen and hydrocarbon radicals of up to 8 carbon atoms, and then vulcanizing said mixture.

2. Process of claim 1 wherein the accelerator is 4-tertiary-butyl-thiosemicarbazide.

3. Process of claim 1 wherein the accelerator is 1,1,4-trimethyl-thiosemicarbazide.

4. A polymer selected from the group consisting of chloroprene homopolymers and chloroprene copolymers containing copolymerized therein in small amounts a monomer selected from the group consisting of dichlorobutadiene, styrene, and acrylonitrile, said polymer containing a metal oxide vulcanizing agent and 0.1–5% by weight of a vulcanization accelerator of the general formula:

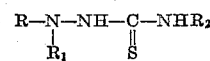

in which R, $R_1$ and $R_2$ stand for a member selected from the group consisting of hydrogen and hydrocarbon radicals of up to 8 carbons.

5. The polymer of claim 4 wherein said accelerator is 4-tertiary-butyl-thiosemicarbazide.

6. The polymer of claim 4 wherein said accelerator is 1,1,4-trimethyl-thiosemicarbazide.

7. A chloroprene homopolymer containing 0.1–5% by weight of 4-tertiary-butyl-thiosemicarbazide as a vulcanization accelerator.

8. A chloroprene homopolymer containing 0.1–5% by weight of 1,1,4-trimethyl-thiosemicarbazide.

References Cited in the file of this patent

Freund et al.: Ber., vol. 29, pp. 2501–02 (1896).